(12) United States Patent
Longman et al.

(10) Patent No.: US 11,887,272 B2
(45) Date of Patent: Jan. 30, 2024

(54) METHOD AND SYSTEM FOR DETERMINING A SPATIAL TRANSFORMATION EMPLOYING PARTIAL DIMENSION ITERATIVE CLOSEST POINT

(71) Applicant: GM GLOBAL TECHNOLOGY OPERATIONS LLC, Detroit, MI (US)

(72) Inventors: Oren Longman, Tel Aviv (IL); Noam Zac, Kfar Saba (IL)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 17/672,809

(22) Filed: Feb. 16, 2022

(65) Prior Publication Data
US 2023/0260078 A1 Aug. 17, 2023

(51) Int. Cl.
| | |
|---|---|
| *G01S 17/89* | (2020.01) |
| *G06T 3/00* | (2006.01) |
| *G01S 13/89* | (2006.01) |
| *G01S 17/931* | (2020.01) |
| *G01S 13/931* | (2020.01) |
| *G06T 7/70* | (2017.01) |
| *G06T 3/60* | (2006.01) |
| *B60W 60/00* | (2020.01) |
| *G06T 7/32* | (2017.01) |

(52) U.S. Cl.
CPC ........ *G06T 3/0068* (2013.01); *B60W 60/001* (2020.02); *G01S 13/89* (2013.01); *G01S 13/931* (2013.01); *G01S 17/89* (2013.01); *G01S 17/931* (2020.01); *G06T 3/60* (2013.01); *G06T 7/32* (2017.01); *G06T 7/70* (2017.01); *B60W 2420/42* (2013.01); *B60W 2420/52* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 2019/0088444 A1* | 3/2019 | Attal | ...................... | G01B 15/02 |
| 2021/0158546 A1* | 5/2021 | He | .......................... | G01S 17/89 |
| 2022/0138896 A1* | 5/2022 | Hou | ...................... | G06T 3/4007 |
| | | | | 382/100 |

* cited by examiner

*Primary Examiner* — Eileen M Adams
(74) *Attorney, Agent, or Firm* — Quinn IP Law

(57) ABSTRACT

A spatial monitoring system employs a partial dimension iterative closest point analysis to provide improved accuracy for point cloud registration. The partial dimension iterative closest point analysis improves registration accuracy by performing optimization in accordance with an error magnitude of each dimension, wherein dimensions having large initial errors are significantly improved, and dimensions having high initial accuracy are further improved. The registration separately optimizes each dimension using surfaces with contributing information for the optimized dimension.

19 Claims, 2 Drawing Sheets

METHOD AND SYSTEM FOR DETERMINING A SPATIAL TRANSFORMATION EMPLOYING PARTIAL DIMENSION ITERATIVE CLOSEST POINT

INTRODUCTION

Spatial monitoring systems employ spatial sensors to monitor a surrounding environment to determine motions of elements in the surrounding environment, to determine motion of a device on which the spatial monitoring system is employed, and to determine motion of elements in the surrounding environment in relation to motion of the device on which the spatial monitoring system is employed.

Vehicles, including non-autonomous, semi-autonomous and autonomous vehicles, may employ a spatial monitoring system having spatial sensors to monitor a surrounding environment for purposes of trajectory planning, route selection, collision avoidance, etc.

There is a need for systems, methods, and apparatuses that can more efficiently process information from spatial monitoring systems to dynamically provide motion perception information, which may be employed to enhance automated driving and other systems.

SUMMARY

The concepts described herein provide a method, system and/or apparatus for a spatial monitoring system that employs a partial dimension iterative closest point analysis that provides improved accuracy for point cloud registration. The partial dimension iterative closest point analysis improves registration accuracy by performing optimization in accordance with an error magnitude of each dimension, wherein dimensions having large initial errors are significantly improved, and dimensions having high initial accuracy are further improved. The registration separately optimizes each dimension using surfaces with contributing information for the optimized dimension.

An aspect of the disclosure includes a spatial sensor and a controller, wherein the spatial sensor is arranged to capture a plurality of successive point clouds of a field of view, and the controller executes point cloud registration for the plurality of successive point clouds. The controller is in communication with the spatial sensor, and has an instruction set that is executable to identify, via the spatial sensor, a plurality of source points associated with a first point cloud and a plurality of target points associated with a second point cloud. A normal calculation is executed for each of the plurality of target points, and each of the plurality of target points is categorized into one of an x, y, or z dimension based upon the normal calculation. An initial transform is determined between the plurality of source points and the plurality of target points. For each of the x, y, and z dimensions, an association is determined between the source points and the target points for the plurality of source points. A correlation cost between the plurality of source points and the plurality of target points is determined via a root-mean-square (RMS) calculation. A new transform is determined based upon the x, y, and z dimensions and the correlation cost between the plurality of source points and the plurality of target points. Source points for the x, y, z dimensions are updated based upon the new transform, and a spatial transformation is determined between the plurality of source points and the plurality of target points based upon updated source points for the x, y, z dimensions.

Another aspect of the disclosure includes executing a normal calculation for each of the plurality of target points by calculating, for each of the target points, a normal using surrounding ones of the target points, estimating the surface plane for the target point, and estimating the normal to the surface plane.

Another aspect of the disclosure includes categorizing the plurality of target points into one of an x, y, or z dimension based upon the normal calculation by categorizing each of the plurality of target points to a respective one of the x, y, or z dimension that aligns with the normal, wherein x, y, and z represent the lateral axis, longitudinal axis, and elevation axis, respectively, defined by the system.

Another aspect of the disclosure includes determining the initial transform between the plurality of source points and the plurality of target points employing an iterative closest point (ICP) analysis.

Another aspect of the disclosure includes the initial transform being a translation transform between the plurality of source points and the plurality of target points and a rotation transform between the plurality of source points and the plurality of target points.

Another aspect of the disclosure includes determining, for the plurality of source points, an association between the source points and the target points by determining a quadratic distance between the source points and the target points based upon the x, y, and z dimensions.

Another aspect of the disclosure includes determining a correlation cost between the plurality of source points and the plurality of target points based upon a root-mean-square (RMS) calculation for a selected one of the x, y, and z dimensions.

Another aspect of the disclosure includes determining the new transform based upon the x, y, and z dimensions that minimizes the correlation costs for the x, y, and z dimensions.

Another aspect of the disclosure includes updating source points for the x, y, and z dimensions based upon the new transform.

Another aspect of the disclosure includes the spatial sensor being one of a LiDAR sensor, a radar sensor, or a digital camera.

Another aspect of the disclosure includes the system being a vehicle, wherein the system determines a position for the vehicle in the x, y, and z dimensions based upon the spatial transformation between the plurality of source points and the plurality of target points.

Another aspect of the disclosure includes the spatial sensor being arranged to monitor a road segment proximal to and forward of the vehicle.

Another aspect of the disclosure includes the vehicle having an advanced driver assistance system (ADAS), and controlling a driving automation state associated with the ADAS based upon the spatial transformation between the plurality of source points and the plurality of target points.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity only, directional terms such as longitudinal, lateral, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" refers to mechanical and electrical hardware, software, firmware, electronic control components, processing logic, and/or processor devices, individually or in combination, that provide the described functionality. This may include, without limitation, an application specific integrated circuit (ASIC), an electronic circuit, a processor (shared, dedicated, or group) that executes one or more software or firmware programs, memory to contain software or firmware instructions, a combinational logic circuit, and/or other components.

Figure 1:
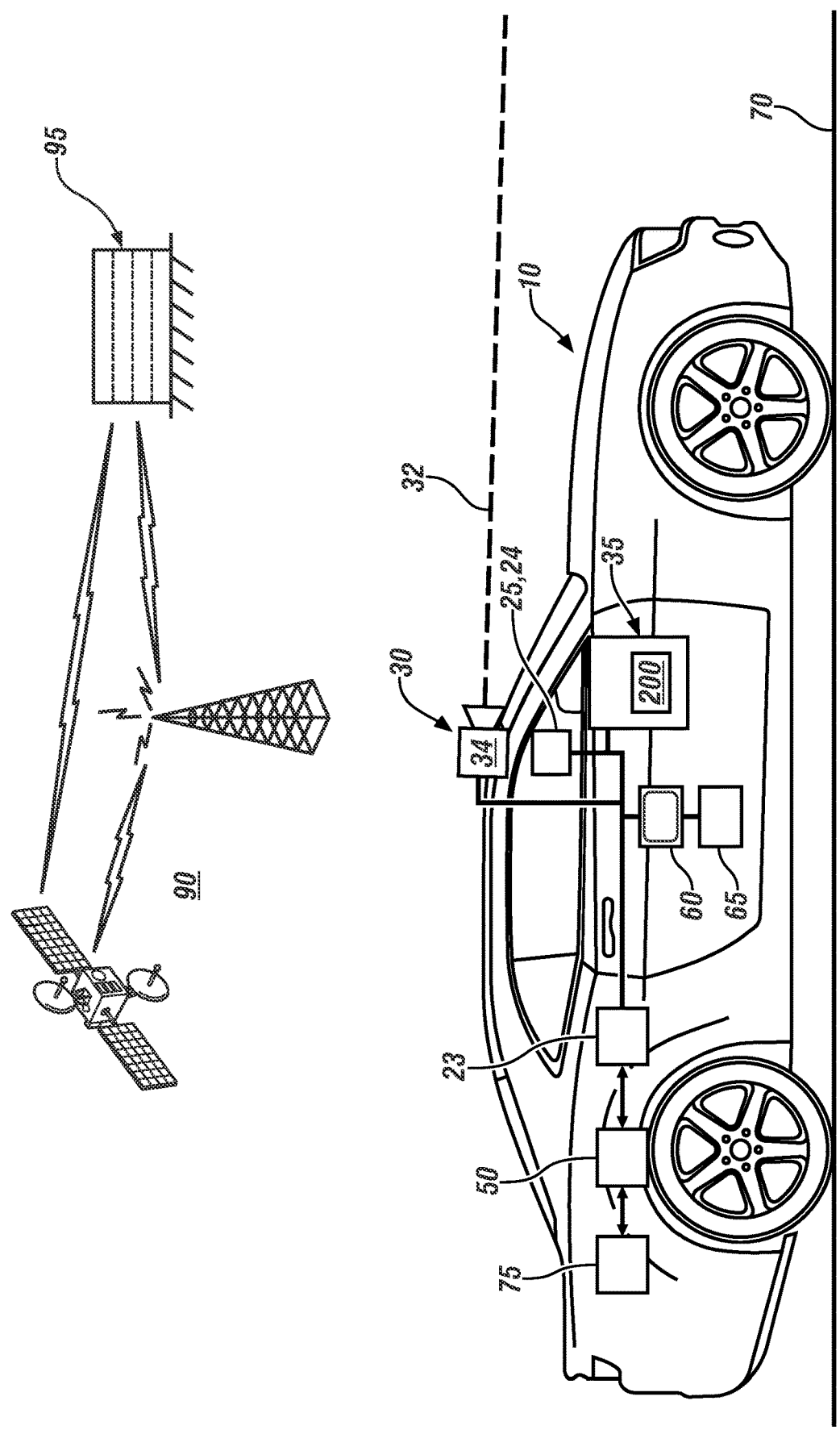
FIG. 1 schematically illustrates a side-view of a vehicle having a spatial monitoring system, in accordance with the disclosure.

Referring to the drawings, wherein like reference numerals correspond to like or similar components throughout the several Figures, FIG. 1, consistent with embodiments disclosed herein, schematically illustrates a side-view of a vehicle 10 that is disposed on and able to traverse a travel surface 70 such as a paved road surface. The vehicle 10 includes a spatial monitoring system 30 that is in communication with a vehicle controller 50. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The vehicle 10 may also include other systems, including an on-board navigation system 24, a computer-readable storage device or media (memory) 23 that includes a digitized roadway map, a global positioning system (GPS) sensor 25, a human/machine interface (HMI) device 60, and in one embodiment an autonomous controller 65 and a telematics controller 75.

In one embodiment, the spatial monitoring system 30 includes at least one spatial sensor 34 and associated system that are arranged to monitor a viewable region 32 that is forward of the vehicle 10, and a spatial monitoring controller 35. The spatial sensor 34 that is arranged to monitor the viewable region 32 forward of the vehicle 10 includes, e.g., a lidar sensor, a radar sensor, a digital camera, etc. In one embodiment, the spatial sensor 34 is disposed on-vehicle to monitor all or a portion of the viewable region 32 to detect proximate remote objects such as road features, lane markers, buildings, pedestrians, road signs, traffic control lights and signs, other vehicles, and geographic features that are proximal to the vehicle 10. The spatial monitoring controller 35 generates digital representations of the viewable region 32 based upon data inputs from the spatial sensors. The spatial monitoring controller 35 can evaluate inputs from the spatial sensor 34 to determine successive point clouds and associated vehicle data of linear range, relative speed, and trajectory of the vehicle 10 in view of each proximate remote object. The spatial sensor 34 may be located at various locations on the vehicle 10, including a front corner, a rear corner, a rear side, a front side, or mid-side. The spatial sensors can include a front radar sensor and a camera in one embodiment, although the disclosure is not so limited. Placement of the spatial sensor 34 permits the spatial monitoring controller 35 to monitor traffic flow including proximate vehicles, intersections, lane markers, and other objects around the vehicle 10.

Data generated by the spatial monitoring controller 35 may be employed by a lane marker detection processor (not shown) to estimate the roadway. The spatial sensors of the vehicle spatial monitoring system 30 may include object-locating sensing devices including range sensors, such as FM-CW (Frequency Modulated Continuous Wave) radars, pulse and FSK (Frequency Shift Keying) radars, and Lidar devices, and ultrasonic devices which rely upon effects such as Doppler-effect measurements to locate forward objects. The possible object-locating devices include charged-coupled devices (CCD) or complementary metal oxide semiconductor (CMOS) video image sensors, and other camera/video image processors which utilize digital photographic methods to 'view' forward objects including one or more vehicle(s).

When the spatial sensor 34 is a LiDAR (Light Detection and Ranging) device, it employs a pulsed and reflected laser beam to measure range or distance to an object. When the spatial sensor 34 is a radar device, it employs radio waves to determine range, angle, and/or velocity of an object. When the spatial sensor 34 is a digital camera, it includes a 2D or 3D image sensor, lens, and controller, with the image sensor being an electro-optical device that converts an optical image into a pixelated digital representation employing a multi-dimensional array of light-sensitive sensing elements. The camera controller is operatively connected to the image sensor to monitor the viewable region 32.

The autonomous controller 65 is configured to implement autonomous driving or advanced driver assistance system (ADAS) vehicle functionalities. Such functionality may include an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle 10. Driving automation can include some level of automatic control or intervention related to simultaneous control of multiple vehicle functions, such as steering, acceleration, and/or braking, with the driver continuously having overall control of the vehicle 10. Driving automation can include simultaneous automatic control of vehicle driving functions that include steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle 10 for an entire trip. Driving automation includes hardware and controllers configured to monitor the spatial environment under various driving modes to perform various driving tasks during dynamic vehicle operation. Driving automation can include, by way of non-limiting examples, cruise control, adaptive cruise control, lane-change warning, intervention and control, automatic parking, acceleration, braking, and the like. The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. As such, the braking command can be generated by the autonomous controller 65 independently from an action by the vehicle operator and in response to an autonomous control function.

Operator controls may be included in the passenger compartment of the vehicle 10 and may include, by way of non-limiting examples, a steering wheel, an accelerator pedal, the brake pedal and an operator input device that is an element of the HMI device 60. The operator controls enable a vehicle operator to interact with and direct operation of the vehicle 10 in functioning to provide passenger transportation. The operator control devices including the steering wheel, accelerator pedal, brake pedal, transmission range selector and the like may be omitted in some embodiments of the vehicle 10.

The HMI device 60 provides for human/machine interaction, for purposes of directing operation of an infotainment system, the global positioning system (GPS) sensor 52, the navigation system 24 and the like, and includes a controller. The HMI device 60 monitors operator requests and provides information to the operator including status of vehicle systems, service and maintenance information. The HMI device 60 communicates with and/or controls operation of a plurality of operator interface devices, wherein the operator interface devices are capable of transmitting a message associated with operation of one of the autonomic vehicle control systems. The HMI device 60 may also communicate with one or more devices that monitor biometric data associated with the vehicle operator, including, e.g., eye gaze location, posture, and head position tracking, among others. The HMI device 60 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI device 60. The HUD may project information that is reflected onto an interior side of a windshield of the vehicle, in the field-of-view of the operator, including transmitting a confidence level associated with operating one of the autonomic vehicle control systems. The HUD may also provide augmented reality information, such as lane location, vehicle path, directional and/or navigational information, and the like.

The on-board navigation system 24 employs the digitized roadway map 25 for purposes of providing navigational support and information to a vehicle operator. The autonomous controller 65 employs the digitized roadway map 25 for purposes of controlling autonomous vehicle operation or ADAS vehicle functions.

The vehicle 10 may include a telematics controller 75, which includes a wireless telematics communication system capable of extra-vehicle communications, including communicating with a communication network 90 having wireless and wired communication capabilities. The telematics controller 75 is capable of extra-vehicle communications that includes short-range vehicle-to-vehicle (V2V) communication and/or vehicle-to-everything (V2x) communication, which may include communication with an infrastructure monitor, e.g., a traffic camera. Alternatively, or in addition, the telematics controller 75 has a wireless telematics communication system capable of short-range wireless communication to a handheld device, e.g., a cell phone, a satellite phone or another telephonic device. In one embodiment the handheld device includes a software application that includes a wireless protocol to communicate with the telematics controller 75, and the handheld device executes the extra-vehicle communication, including communicating with an off-board server 95 via the communication network 90. Alternatively, or in addition, the telematics controller 75 executes the extra-vehicle communication directly by communicating with the off-board server 95 via the communication network 90.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.), which are indicated by memory 23. The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

A point cloud is a set of data points in space, which may be captured by the spatial sensor 34 described with reference to FIG. 1. The points may represent a 3D shape or object. Each point position has its set of Cartesian coordinates (x, y, z) that are defined with regard to a reference, e.g., a vehicle. Point cloud registration is the process of aligning two or more 3-D point clouds of the same scene into a common coordinate system by finding a rigid transformation from one point to another point so they align. A point cloud transformation has translation dimensions of x, y, z, and rotation dimensions of yaw, pitch, and roll.

One process for determining a point cloud transformation is Iterative closest point (ICP), which is a method of matching two datasets by minimizing the distance between two sets of points. In ICP, one point cloud (vertex cloud), i.e., the reference, or target, is kept fixed, while the other one, the source, is transformed to best match the reference. ICP may be used in lidar registration to match between point clouds for various techniques such as vehicle motion estimation. ICP is also used in other fields, e.g., computer vision systems.

The minimization is operated on all six dimensions of translation (x,y,z) and rotation (yaw, pitch, roll) simultaneously, and may be performed with methods such as the Newton-Raphson method. In one embodiment, an ICP algorithm determines a transformation between two point clouds by minimizing the square errors between the corresponding entities.

However, ICP registration performance may be limited and may not provide sufficient accuracy for all tasks. In registration problems the error may be not consistent across the six dimensions. Some dimensions may exhibit no error, whereas other dimensions may have substantial initial errors. ICP does not account for the dimensional inconsistency in errors, and instead performs estimation for all dimensions, which may deteriorate accuracy at dimensions with low error.

As such, a spatial transformation between two point clouds is determined employing a Partial Dimension Iterative Closest Point analysis. In the optimization process the optimization step size for each dimension is normalized according to the dimension error standard deviation (STD), thus taking into account the difference in error in each dimension, and disregarding dimensions having a STD error of zero.

Figure 2:
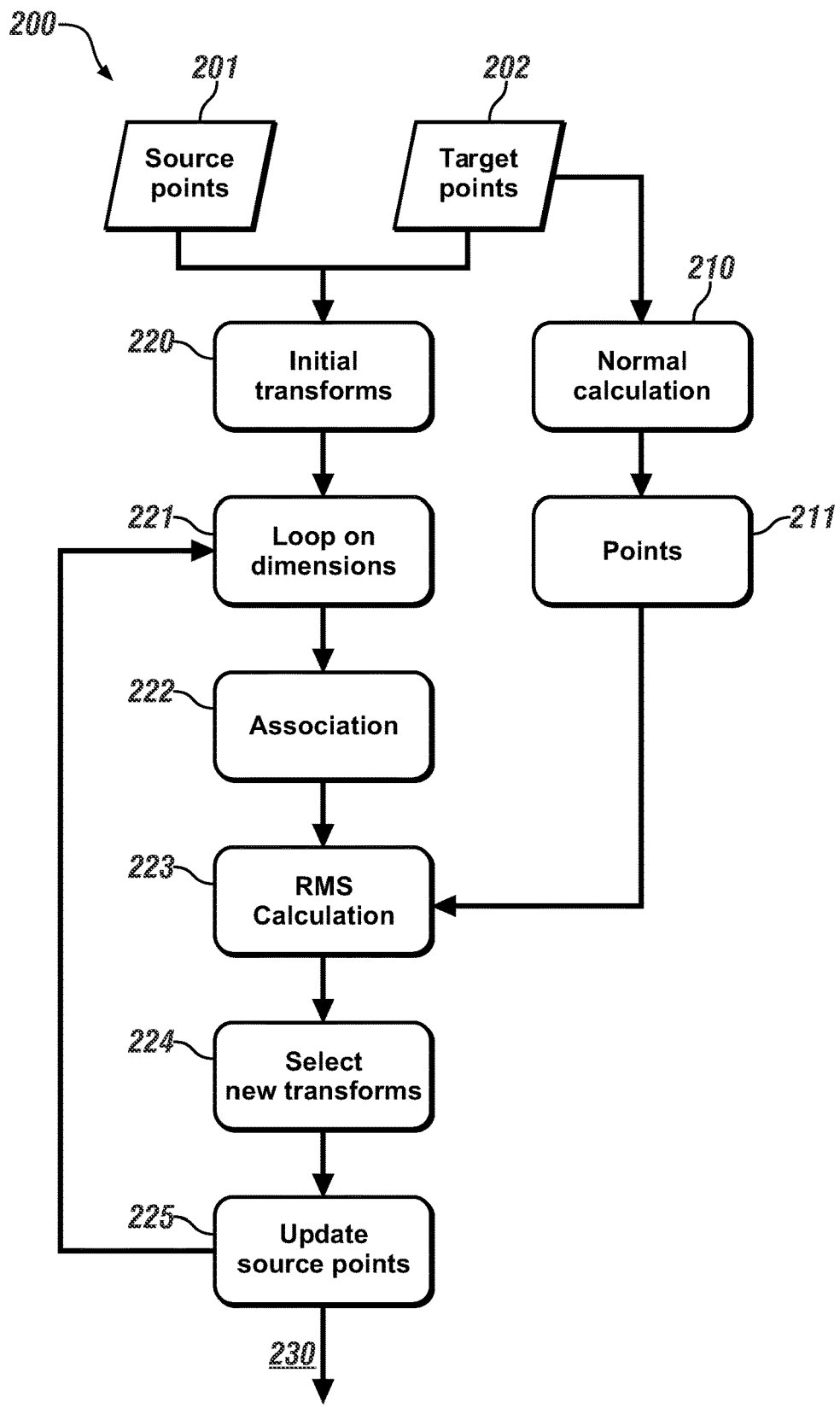
FIG. 2 schematically illustrates a flowchart for a partial dimension iterative closest point analysis, in accordance with the disclosure.

FIG. 2 schematically shows an embodiment of a Partial Dimension Iterative Closest Point (PD-ICP) routine 200 for determining a spatial transformation or registration between successively captured point clouds, wherein the spatial transformation is defined by translation (x,y,z) dimensions and by rotation (roll, pitch, yaw) dimensions. The PD-ICP routine 200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the system 100 shown in FIG. 1.

TABLE 1

| BLOCK | BLOCK CONTENTS |
| --- | --- |
| 201 | Source points |
| 202 | Target points |
| 210 | Calculate normal for target points |
| 211 | Categorize target points |
| 220 | Determine initial transforms |
| 221 | Execute loop on dimensions x, y, z |
| 222 | Determine association |
| 223 | Calculate cost function (RMS) |
| 224 | Select new transform |
| 225 | Update source points |
| 230 | Determine spatial transformation |

Execution of the PD-ICP routine 200 may proceed as follows. The steps of the PD-ICP routine 200 may be executed in a suitable order, and are not limited to the order described with reference to FIG. 2.

Inputs to the PD-ICP routine 200 include source points 201 and target points 202. The target points 202 represent data points associated with a first, fixed point cloud captured by the spatial sensor 34 that represents the FOV 32 at a first point in time, and the source points 201 represent a second point cloud that is captured by the spatial sensor 34 that represents the FOV 32 at a second, subsequent point in time.

A normal is calculated for the target points 202 (Step 210). This calculation includes calculating a normal for each point of the target points 202. The normal is estimated using surrounding points to estimate the surface plane that the point belongs to, and the normal to this plane.

The normal $\overline{n}_p$ of each point is defined as $\overline{n}_p = (n_x, n_y, n_z)$, wherein $n_x$ is the x axis value of the normal, $n_y$ is the y axis value of the normal, and $n_z$ is the z axis value of the normal. The terms x, y, and z represent the lateral axis, longitudinal axis, and elevation axis, respectively, as defined by the vehicle or other platform on which the system 100 is implemented.

The target points are categorized to one of the three translation dimensions of x,y,z (Step 211). Each point is categorized to the dimension its normal is aligned with, or is removed when the direction difference is above a threshold to filter out points that have weak association with the normal.

The dimension selection is defined as follows:

$$d = \underset{i \in \{x,y,z\}}{\operatorname{argmax}} |n_i|, \overline{n_p} = (n_x, n_y, n_z) \quad [1]$$

The filter criterion is an arc cosine ($\cos^{-1}$) of the point in relation to the respective axis in one embodiment. When the calculated arc is large enough, the normal is said to be associated with the axis. The arc can be determined as follows:

$$\cos^{-1} e_d \cdot \frac{\overline{n_p}}{|\overline{n_p}|} > \text{Threshold} \quad [2]$$

wherein:
$\overline{n_p}$ is the point normal;
$n_i$ (i.e., one of $n_x, n_y, n_z$) is the normal value at the i axis;
$e_d$ is the unit vector of axis d; and
the threshold is a calibratable arc parameter, e.g., 60°.

The optimization process initially determines initial transforms between the source points 201 and the target points 202. The initial transforms may be predetermined, or may be determined employing an iterative closest point (ICP) algorithm (Step 220). The initial transforms include translation (x,y,z) and rotation (yaw, pitch, roll). The source points are transformed accordingly, with an updated set of source points being calculated for each transform.

The optimization process proceeds by executing three iterations, with a separate iteration for each of the x, y, and z dimensions (Step 221).

Each iteration, the points associated with the closest points in the target are calculated (Step 222) as a quadratic distance D, as follows:

$$D = \sqrt{(x_s - x_t)^2 + (y_s - y_t)^2 + (z_s - z_t)^2} \quad (3)$$

wherein:
$(x_s, y_s, z_s)$ is the source point; and
$(x_t, y_t, z_t)$ is the target point.

A cost function of the correlation between the source and target points is calculated using root mean square (RMS) on points which are categorized to the dimension (x, y or z) of the present iteration (Step 223) i.e., for each transform:

$$C_i = \sqrt{\frac{1}{|K_{i_d}|} \sum_{(p_s, p_t) \in K_{i_d}} \|p_t - p_s\|^2} \quad [4]$$

wherein:
$C_i$ is a correlation cost;
i is the transform index;
$K_{i_d}$ is the set of associated points of dimension d, for transform I;
$p_t$ is the target point; and
$p_s$ is the source point.

A new transform is selected (Step 224), as follows. Each transform includes a transform in each of the translation dimensions of x, y, z, and the rotation dimensions of yaw, pitch, and roll. The dimensions that are updated are the translation dimension d of the present iteration. For the rotation dimensions, the dimension perpendicular to d is excluded. Thus, roll, pitch and yaw are excluded for x, y, and z, respectively. New transforms are obtained based on the correlation cost $C_i$, (EQ. 4) using an optimization process, such as Nelder-Mead simplex\gradient descent that minimizes the correlation cost $C_i$.

The dimensions update is regulated using a learning rate factor:

$$I_d = \min(STD(d), 1) \quad [5]$$

wherein:
$I_d$ is the learning rate factor for dimension d, with the update step being multiplied with this factor; and
STD(d) is the standard deviation of the error of dimension d associated with the initial transform.

The new transforms are used to update the source points, i.e., x, y, z (Step 225), and the process 200 iterates on the updated points.

After the process is performed at a pre-defined quantity of iterations for dimensions x, y, z, a final spatial transformation is generated and output, wherein the final spatial transformation has translation (x,y,z) dimensions and rotation (roll, pitch, yaw) dimensions (Step 230).

The results of final spatial transformation can be employed to dynamically update the position of the vehicle 10 in real-time.

This information can be used to verify information from GPS, or as a replacement for information from GPS.

The PD-ICP algorithm 200 provides a dimension-selective optimization method to determine a final spatial transformation between two point clouds.

When employed on an embodiment of the vehicle 10 described with reference to FIG. 1 with ADAS capability, motion of the vehicle can be advantageously guided based upon the final spatial transformation that is determined employing the PD-ICP algorithm 200. The autonomous controller 65 is able to control a driving automation state associated with the ADAS, such as acceleration, steering or braking, based upon the final spatial transformation that is determined employing the PD-ICP algorithm 200

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A system for determining an image spatial transformation/image point cloud registration, comprising:
 a spatial sensor and a controller;
 the spatial sensor arranged to capture a plurality of point clouds of a field of view;
 the controller in communication with the spatial sensor, the controller having an instruction set that is executable to:
 identify, via the spatial sensor, a plurality of source points associated with a first point cloud;
 identify, via the spatial sensor, a plurality of target points associated with a second point cloud;
 execute a normal calculation for each of the plurality of target points;
 categorize the plurality of target points into one of an x, y, or z dimension based upon the normal calculation;
 determine an initial transform between the plurality of source points and the plurality of target points;
 for each of the x, y, and z dimensions:
  determine, for the plurality of source points, an association between the plurality of source points and the plurality of target points,
  determine a correlation cost between the plurality of source points and the plurality of target points,
  determine a new transform based upon the x, y, and z dimensions and the correlation cost between the plurality of source points and the plurality of target points, and
  update source points for the x, y, and z dimensions based upon the new transform; and
 determine a spatial transformation between the plurality of source points and the plurality of target points based upon updated source points for the x, y, and z dimensions.

2. The system of claim 1, wherein the instruction set being executable to execute a normal calculation for each of the plurality of target points comprises:
 calculating, for each of the target points, a normal using surrounding ones of the target points,
 estimating a surface plane for the target point, and
 estimating the normal to the surface plane.

3. The system of claim 1, wherein the instruction set being executable to categorize the plurality of target points into one of an x, y, or z dimension based upon the normal calculation comprises the instruction set being executable to categorize each of the plurality of target points to a respective one of the x, y, or z dimension that aligns with the normal, wherein x, y, and z represent the lateral axis, longitudinal axis, and elevation axis, respectively, defined by the system.

4. The system of claim 1, wherein the instruction set being executable to determine an initial transform between the plurality of source points and the plurality of target points comprises the instruction set being executable to determine the initial transforms employing an iterative closest point (ICP) analysis.

5. The system of claim 4, wherein the initial transform includes a translation transform between the plurality of source points and the plurality of target points and a rotation transform between the plurality of source points and the plurality of target points.

6. The system of claim 1, wherein the instruction set being executable to determine, for the plurality of source points, an association between the source points and the target points comprises determining a quadratic distance between the source points and the target points based upon the x, y, and z dimensions.

7. The system of claim 1, wherein the instruction set is executable to determine a correlation cost between the plurality of source points and the plurality of target points based upon a root-mean-square (RMS) calculation for a selected one of the x, y, and z dimensions.

8. The system of claim 1, wherein the instruction set is executable to determine the new transform based upon the x, y, and z dimensions that minimizes the correlation costs for the x, y, and z dimensions.

9. The system of claim 1, wherein the instruction set is executable to update source points for the x, y, and z dimensions based upon the new transform.

10. The system of claim 1, wherein the spatial sensor comprises a LiDAR sensor.

11. The system of claim 1, wherein the spatial sensor comprises a radar sensor.

12. The system of claim 1, wherein the spatial sensor comprises a digital camera.

13. The system of claim 1, wherein the system comprises a vehicle; and wherein the system determines a position for the vehicle in the x, y, and z dimensions based upon the spatial transformation between the plurality of source points and the plurality of target points.

14. The system of claim 13, wherein the spatial sensor is arranged to monitor a road segment proximal to and forward of the vehicle.

15. The system of claim 13, wherein the vehicle has an advanced driver assistance system (ADAS), and further comprising the instruction set being executable to control a driving automation state associated with the ADAS based upon the spatial transformation between the plurality of source points and the plurality of target points.

16. A method for determining an image spatial transformation, the method comprising:
 capturing, via a spatial sensor, a plurality of point clouds of a field of view;
 identifying a plurality of source points associated with a first point cloud;
 identifying a plurality of target points associated with a second point cloud;
 executing, via a controller, a normal calculation for each of the plurality of target points;
 categorizing the plurality of target points into one of an x, y, or z dimension based upon the normal calculation;
 determining an initial transform between the plurality of source points and the plurality of target points; and
 for each of the x, y, and z dimensions:
  determining, for the plurality of source points, an association between the plurality of source points and the plurality of target points,
  determining a correlation cost between the plurality of source points and the plurality of target points,
  determining a new transform based upon the x, y, and z dimensions and the correlation cost between the plurality of source points and the plurality of target points, and
  updating source points for the x, y, and z dimensions based upon the new transform; and
 determining a spatial transformation between the plurality of source points and the plurality of target points based upon updated source points for the x, y, and z dimensions.

17. The method of claim 16, wherein executing a normal calculation for each of the plurality of target points comprises:
- calculating, for each of the target points, a normal using surrounding ones of the target points,
- estimating a surface plane for the target point, and
- estimating the normal to the surface plane.

18. The method of claim 17, wherein categorizing the plurality of target points into one of an x, y, or z dimension based upon the normal calculation comprises categorizing each of the plurality of target points to a respective one of the x, y, or z dimension that aligns with the normal, wherein x, y, and z represent the lateral axis, longitudinal axis, and elevation axis, respectively.

19. The method of claim 16, wherein determining for the plurality of source points an association between the source points and the target points comprises determining a quadratic distance between the source points and the target points based upon the x, y, and z dimensions including a root-mean-square (RMS) calculation for a selected one of the x, y, and z dimensions.

\* \* \* \* \*